United States Patent
Hajiani (10) Patent No.: US 10,718,036 B2
(45) Date of Patent: Jul. 21, 2020

(54) SYSTEM AND A METHOD FOR METALLURGICAL EXTRACTION OF RARE EARTH ELEMENTS AND NIOBIUM

(71) Applicant: GEOMEGA RESOURCES INC., Boucherville (CA)

(72) Inventor: Pouya Hajiani, Saint-Lambert (CA)

(73) Assignee: GEOMEGA RESOURCES INC. (CA)

(*) Notice: Subject to any disclaimer, the term of this patent is extended or adjusted under 35 U.S.C. 154(b) by 351 days.

(21) Appl. No.: 15/578,498

(22) PCT Filed: Jun. 14, 2016

(86) PCT No.: PCT/CA2016/050680
§ 371 (c)(1),
(2) Date: Nov. 30, 2017

(87) PCT Pub. No.: WO2016/201558
PCT Pub. Date: Dec. 22, 2016

(65) Prior Publication Data
US 2018/0163284 A1    Jun. 14, 2018

Related U.S. Application Data (60) Provisional application No. 62/180,663, filed on Jun. 17, 2015.

(51) Int. Cl.
C22B 59/00      (2006.01)
C22B 3/06       (2006.01)
(Continued)

(52) U.S. Cl.
CPC ............ *C22B 59/00* (2013.01); *C22B 3/06* (2013.01); *C22B 3/22* (2013.01); *C22B 3/44* (2013.01); *C22B 34/24* (2013.01); *Y02P 10/234* (2015.11)

(58) Field of Classification Search
CPC .... C22B 3/14; C22B 3/22; C22B 3/44; C22B 59/00; Y02P 10/234
(Continued)

(56) References Cited

U.S. PATENT DOCUMENTS 1,969,769 A  *  8/1934  Sweet ...................... C22B 3/14
                                                   423/51
3,699,208 A      10/1972  Brunig et al.
(Continued)

FOREIGN PATENT DOCUMENTS

CN      103215463 A     7/2013

OTHER PUBLICATIONS

Machine translation of CN-103215463 A, (Year: 2013).*
(Continued)

*Primary Examiner* — Steven J Bos
(74) *Attorney, Agent, or Firm* — Lavery, De Billy, LLP; Gwendoline Bruneau (57) ABSTRACT

A method for hydrometallurgical extraction of rare earth elements and niobium from a an ore or a flotation concentrate containing rare earth elements, niobium, iron and alkali earth metals, the method comprising removal of the alkali earth metals using an acidic solution of a pH in a range between about 1 and about 6, leaching the rare earth elements; precipitation of the rare earth elements from a resulting pregnant leach solution using sodium hydroxide, sodium carbonate and sodium bicarbonate; physically separating metal hydroxides from a resulting leach residue containing metal hydroxides, iron oxide, silicate, and pyrochlore; removing the iron oxide by physical beneficiation and then by atmospheric acid leaching; and recovering niobium from a clean solid residue by pressurized acid leaching.

14 Claims, 4 Drawing Sheets

(51) Int. Cl.
*C22B 3/22* (2006.01)
*C22B 3/44* (2006.01)
*C22B 34/24* (2006.01)

(58) Field of Classification Search
USPC ......... 423/21.1, 68, 138–166, 371, 184–209, 423/481, 488, 326
See application file for complete search history.

(56) References Cited

U.S. PATENT DOCUMENTS

| 5,433,931 A | 7/1995 | Bosserman |
| 2005/0180910 A1 | 8/2005 | Park et al. |
| 2013/0287673 A1 | 10/2013 | Wang et al. |
| 2014/0134084 A1 | 5/2014 | Komon et al. |

OTHER PUBLICATIONS

Park, Hyun Kiy, et al. "Acid leaching of CaO—SiO2 resources." Journal of Industrial and Engineering Chemistry (2013): 633-639.
International Search Report dated Sep. 21, 2016 in PCT/CA2016/050680 filed on Jun. 14, 2016.

* cited by examiner

FIG. 4

SYSTEM AND A METHOD FOR METALLURGICAL EXTRACTION OF RARE EARTH ELEMENTS AND NIOBIUM

CROSS-REFERENCE TO RELATED APPLICATIONS

This application is a National Entry Application of PCT application no PCT/CA2016/050680 filed on Jun. 14, 2016 and published in English as WO 2016/201558 under PCT Article 21(2), which itself claims benefit of U.S. Provisional Pat. App. Ser. No. 62/180,663, filed on Jun. 17, 2015. All documents above are incorporated herein in their entirety by reference.

FIELD OF THE INVENTION

The present invention relates to extraction of rare earth elements (REEs). More specifically, the present invention is concerned with a system and method for metallurgical extraction of REE and Niobium from ferro-carbonatite.

BACKGROUND OF THE INVENTION

The viability of an extractive metallurgy method of rare earth elements (REEs) to produce an intermediate mixed concentrate depends upon a low-cost simple process. It has been known that regardless of the mineral, the operational cost (OPEX) of any REE extraction method, particularly when the initial REE grade is low, is tightly related to acid consumption during the method. Beside acid, other reagents used in the method also impact the operational cost. This makes minimizing acid consumption in an REE extraction method a priority. The acid consumption in different methods has been reported to be between about 100 kg ant about 1000 kg HCl 100% per ton of ore, with an average of about 500 kg/T HCl 100, depending on the REE grade in the ore and in the concentrate.

There is still a need in the art for a system and a method for metallurgical extraction of rare earth elements.

SUMMARY OF THE INVENTION

More specifically, in accordance with the present invention, there is provided a method for hydrometallurgical extraction of rare earth elements and niobium from a an ore or a flotation concentrate containing rare earth elements, niobium, iron and alkali earth metals, the method comprising removal of the alkali earth metals using an acidic solution of a pH in a range between about 1 and about 6, leaching the rare earth elements; precipitation of the rare earth elements from a resulting pregnant leach solution using sodium hydroxide, sodium carbonate and sodium bicarbonate; physically separating metal hydroxides from a resulting leach residue of the leaching, the leach residue containing metal hydroxides, iron oxide, silicate, and pyrochlore; removing the iron oxide by physical beneficiation and then by atmospheric acid leaching; and recovering niobium from a clean solid residue by pressurized acid leaching.

There is further provided a method for extracting rare earth elements and niobium from a ferrocarbonatite ore, comprising a) leaching niobium with a fresh acid; b) recovering the acid used in a), niobium in an organic phase and solid residues, by solvent extraction; c) leaching and acid washing the solid residues using the acid recovered in b), to yield ferric chloride; and c) using the ferric chloride produced in c) to extract rare earth elements.

There is further provided a method for extracting rare earth elements and niobium from a ferrocarbonatite ore, comprising: a) removing $CO_2$ from the ore; b) removing a first part of active metals from the ore; and c) removing a remaining part of the active metals and recovering the rare earth elements and niobium.

There is further provided a method for removing alkali earth metals from an ore or a pre-concentrate, comprising using an acid solution at a pH in a range between 1 and 6.

There is further provided a method comprising selectively leaching rare earth elements from an ore, using ferric chloride.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

Figure 1:
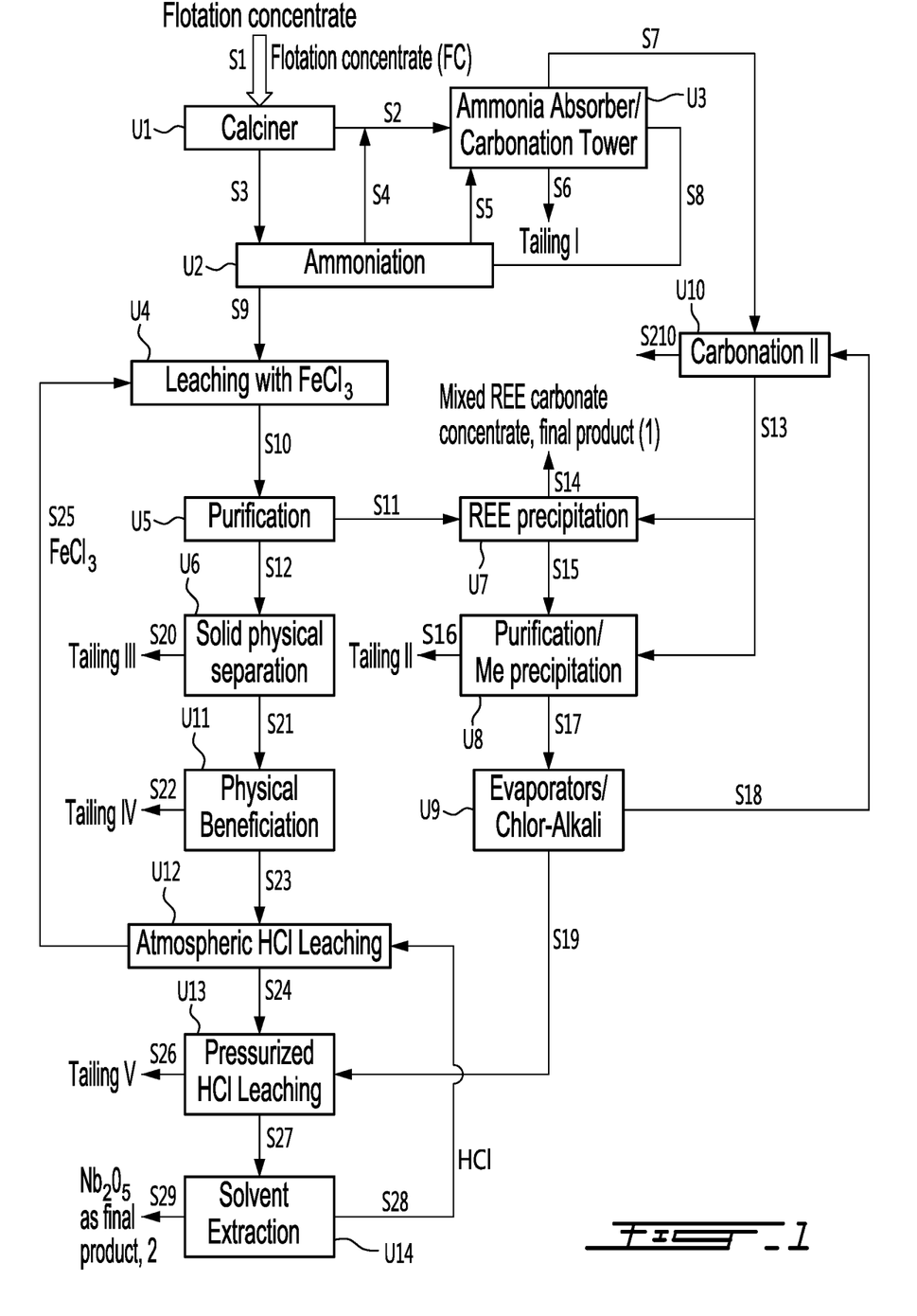
FIG. 1 is a flowchart of a method according to an embodiment of an aspect of the present invention.

A method according to an embodiment of the present invention will be described in relation to the flowchart of FIG. 1.

The starting material is a flotation concentrate (FC) S1 of ferro-carbonatite, i.e. containing rare earth elements (REEs) and Niobium. A typical flotation concentrate composition, such as a flotation concentrate of ferro-carbonatite minerals of Montviel Deposit in Québec, comprises REEs, niobium and gangue minerals as shown in Table 1 below for example:

TABLE 1

| Element | Elem. w/w % |
| --- | --- |
| Fe | 21.53 |
| Ba | 6.52 |
| Sr | 2.35 |
| Ca | 6.65 |
| Mg | 3.77 |
| Mn | 2.76 |
| Si | 1.12 |

TABLE 1-continued

| Element | Elem. w/w % |
|---|---|
| Nb | 0.21 |
| REE | 3.99 |

The flotation concentrate S1 is directed to a calciner U1 for removal of $CO_2$, by a thermal treatment, i.e. 2 to 4 hours at a temperature in a range between about 500° C. and about 1200° C., yielding a volatile fraction S2 and a calcined fraction S3.

The calcined fraction S3 contains all of the metals from the flotation concentrate S1, mostly in an oxide form. Indeed, the loss on ignition (LOI) of the flotation concentrate is up to 32% during calcination in the calciner U1 and almost all the metals are converted in form of oxides. The REE grade is thus upgraded to about 5.9% w/w based on elemental analysis (elem.) in 68% mass pull (MP) of flotation concentrate (U1).

Active metals, i.e. alkali earth metals originated from the gangue minerals, are then removed from the calcined fraction S3, using an acidic solution of a pH in a range between about 1 and about 6, using weak acids such as acetic acid or carbonic acid or a combination thereof, or an aqueous solution of a salt which gives mild acidic solution. For example, it is submitted to ammoniation (U2), for removing the alkali earth metals, using an aqueous solution of ammonium chloride. Alkali earth metal oxides react with ammonium chloride and dissolve, releasing ammonium gas, according to:

$$MeO+2NH_4Cl \Longrightarrow MeCl_2+2NH_3+H_2O, Me=Ca,Mg,Br,Sr \quad \text{(relation 1)}$$

Table 2 below shows typical metal removal recovery percentage during ammoniation (U2).

TABLE 2

| Element | Elem. % Rec |
|---|---|
| K | 84.9 |
| Ba | 65.3 |
| Sr | 74.5 |
| Ca | 93.1 |
| Mg | 61.4 |
| Mn | 6.8 |

Wet ammonia gas $NH_3$ (S4), and a filtrate S5, i. e. metal chloride with some excess ammonium chloride, generated during ammoniation (U2) are directed to a carbonation tower (U3).

The volatile fraction S2 obtained by calcination (U1) of the flotation concentrate is mainly $CO_2$. It is also discharged to the ammonia absorber/carbonation tower unit (U3), together with the metal chloride S5, for regeneration. In the ammonia absorber/carbonation unit tower unit (U3), a mixture of the ammonia gas (S4) produced during ammoniation (U2) of the volatile fraction (S2), and $CO_2$ obtained by calcination (U1), is fed to a bubble column reactor in contact with the filtrate (S5) from the ammoniation (U2), carrying the metal chlorides $MeCl_2$. Basic properties of the reaction medium bestowed to the highly soluble ammonia gas, shifts the dissociation reaction of carbonate/bicarbonate toward carbonate ion which results in precipitation of $MeCO_3$ due to limited solubility. This reaction recovers $NH_4Cl$ salt in solution. Some metals precipitate in part in the form of $Me(OH)_2$ at a pH in a range between about 7 and about 12 (see relation 5b). Thus the weak acid or salt used in U2 is regenerated using $CO_2$ gas or a dissolved form of CO2 gas, i.e. carbonic acid, bicarbonate or carbonate ions.

$$NH_3+H_2O \Longrightarrow NH_4OH \quad \text{(relation 2)}$$

$$CO_2+H_2O \Longleftrightarrow HCO_3^-+H^+ \Longleftrightarrow CO_3^{2-}+2H^+ \quad \text{(relation 3)}$$

$$2NH_4^++CO_3^{2-} \Longrightarrow (NH_4)_2CO_3 \quad \text{(relation 4)}$$

$$MeCl_2+(NH_4)_2CO_3 \Longrightarrow MeCO_3+2NH_4Cl, Me=Ca,Mg,Br,Sr \quad \text{(relation 5a)}$$

$$MeCl_2+2NH_4OH \Longrightarrow Me(OH)_2+2NH_4Cl, Me=Ca,Mg \quad \text{(relation 5b)}$$

Tailing I (S6) is obtained, i.e., metal carbonate $MeCO_3$ precipitated during basic carbonation of metal chlorides in the ammonia absorber/carbonation tower unit (U3) (relation 5).

An excess $CO_2$ gas S7, originally from the calciner (U1), is directed to a Carbonation II unit (U10), for reaction with a sodium hydroxide NaOH solution (relation 11) as discussed hereinbelow.

A regenerated ammonium chloride solution S8 is returned from the ammonia absorber/carbonation tower unit (U3) to the ammoniation unit (U2) for reaction with alkali earth metal oxides of the calciner fraction S3 of the flotation concentrate (relation 1, 6) as discussed hereinabove.

An ammoniated concentrate S9, i.e. the calcined concentrate (metals oxides) after removing significant amount of the alkali earth metals related to the gangue minerals Ca, Mg, Ba and Sr (Table 2 above), with REEs grade of about 7.3% w/w (elem.) in 55% of flotation concentrate mass, is directed to a leaching reactor (U4).

The remaining active metals and rare earth elements are then removed by leaching at atmospheric pressure, at a pH of about 1, using ferric chloride $FeCl_3$. In the leaching reactor (U4), a ferric chloride $FeCl_3$ solution reacts with the thus obtained rare earth oxides (REOs) and other metals oxides MeO which were not removed in the ammoniation unit U2. This reactor is maintained at a temperature in a range between about 65° C. and 95° C., for example at 85° C., at atmospheric pressure, with a pH remaining at about 1. The $Fe^{III}$ precipitates in the form of iron hydroxide $Fe(OH)_3$ according to:

$$2y/3FeCl_3+Me_xO_y+yH_2O \Longrightarrow xMeCl_{2y/x}+2y/3Fe(OH)_3 \quad (Me=REE,Mn,Ca,Mg,Br,Sr,Al,U,Th) \quad \text{(relation 6)}.$$

Alternatively, the remaining active metals and rare earth elements could be removed by leaching with fresh dilute HCl at atmospheric pressure, while keeping the pH at about 1. In this alternative, the acid will be consumed to extract the active metals and rare earth elements. However, the leaching is selective against the iron bestowed to the reaction condition and the abovementioned pretreatments (i.e. calcination and ammoniation). Therefore, the acid consumption is much less than conventional leaching methods in which all the iron and active metals leaches in order to recover the rare earth elements.

Selective leaching with ferric chloride as described herein may be preferred to leaching with fresh dilute HCl with fresh dilute HCl when ferric chloride is available, since it does increase total acid consumption.

This leaching of the rare earth elements and active metals with ferric chloride at atmospheric pressure is selective against less reactive metals, such as ferric oxides. Table 3 below shows typical metal recovery during this spent leaching with ferric chloride $FeCl_3$ (U4). Numbers are based on the floatation concentrate content (total recoveries).

TABLE 3

| Element | Elem. w/w % Rec |
|---|---|
| REE | 95.5 |
| Ba | 18.4 |
| Sr | 34.3 |
| Ca | 18.8 |
| Mg | 6.2 |
| Mn | 7.3 |
| Al | 99.3 |
| U | 22.4 |
| Th | 43.7 |

The output S10 of the spent leaching reactor (U4) is a two-phase stream.

A liquid phase contains REE chlorides and other metal chlorides. The liquid is slightly acidic, with a pH around 1. The remaining ferric chloride from spent leaching (U4) with some aluminum, U and Th chlorides are considered as major impurities which need be removed from the pregnant leach solution (PLS) before REE precipitation to improve the purity of the resulting mixed REE concentrate.

Two different particles are mixed in the solid phase: a) ferric hydroxide precipitate, which is a product of the leaching reaction in U4 (relation 6); and b) ferric oxide from the ammoniated concentrate S9, which is not reacted in the spent leaching reactor (U4) and containing some silicate and pyrochlore, mostly attached to iron oxide particles.

Before precipitation of REE from the pregnant leach solution (PLS), the amount of those metals needs be reduces so as to reduce their presence as impurities in the final mixed REE concentrate. In order to do that, in a purification reactor (U5), the pH of the output S10 from the spent leaching reactor (U4) is increased, to about 3.1, by adding a sodium hydroxide NaOH solution. Some impurities (Fe, Al, Th, U) precipitate as metal hydroxides (see relation 6):

$$MeCl_x + xNaOH \Longrightarrow Me(OH)_x + xNaCl \quad \text{(relation 6)}$$

A liquid phase S11, purified from these impurities Fe, Th, U and Al as metal hydroxides (to some extent), from the purification reactor (U5), and loaded with REE chlorides, is directed to a REE precipitation unit (U7).

The solid phase S12 of the output S10 of the spent leaching reactor (U4) comprising all ferric iron hydroxide, Th hydroxide, Al hydroxide and U hydroxide precipitated during purification (U5), mixed with ferric oxide particles from S10, is directed to a solid physical separation unit (U6). The solid phase, as a filter cake, S12 comprises ferric hydroxides which have been precipitated during purification (U4, U5) and a leach residue, which contains mostly iron oxide that has not reacted in U2/U4/U5. This iron residue also contains the pyrochlore mineral (Nb source) and silicate. These two powders, i.e. the precipitated ferric hydroxides and the non-reacting iron oxide, show different physical properties, which allows separating them without using any chemical reagent, yielding Tailing III (S20) and a solid residue S21. The non-reacting ferric oxide is separated from the ferric hydroxide precipitates by physical separation techniques such as shaking table, sensor-based sorting, gravity separation and magnetic separation.

In the precipitation unit (U7), REE is precipitated from the purified pregnant leach solution (PLS) (S11) by adding a basic solution of sodium carbonate $Na_2CO_3$ and sodium hydroxide NaOH (S13), generated in the carbonation II unit (U10). The precipitated rare earth-carbonates are filtered and washed as the final mixed REE concentrate (S14). Controlling the pH between 3.0 and 4.0 is important in the precipitation unit (U7) to complete the REE carbonation reaction while minimizing the presence of impurities in the final REE concentrate (S14). The corresponding reaction reads (where REE stands for: rare earth element):

$$2REECl_3 + 3Na_2CO_3 \Longrightarrow REE_2(CO_3)_3 + 6NaCl \quad \text{(relation 7)}$$

The depleted leach solution (DLS) S15 thus contains mostly NaCl with some other metal chlorides, such as Mn, Ca, Mg, Sr, Ba.

In a purification/metal precipitation unit (U8), a mix of sodium hydroxide NaOH and sodium carbonate $Na_2CO_3$ (S13) from the carbonation II unit (U10) is added to the depleted leach solution S15, thereby precipitating the remaining metal impurities in the form of metal hydroxide or metal carbonite (S16=Tailing II), as per relations 8 and 9 respectively.

$$MeCl_2 + 2NaOH \Longrightarrow Me(OH)2 + 2NaCl(Me:Ca,Mg,Sr,Ba,Mn) \quad \text{(relation 8)}$$

$$MeCl_2 + Na_2CO_3 \Longrightarrow MeCO_3 + 2NaCl \quad \text{(relation 9)}$$

The resulting NaCl solution S17 is recycled to evaporators and then to a Chlor-Alkali unit (U9) for conversion to HCl and NaOH. The Chlor-Alkali unit converts the NaCl solution (S17) to NaOH (S18) and HCl (S19) solutions using electricity power. The salt solution must be concentrated to 25% (w/w), which is continuously achieved by the evaporators.

The NaOH solution (S18) from the Chlor-Alkali unit (U9) absorbs the $CO_2$ gas (S7) from the calciner (U1) in a bubble column of the Carbonation II unit (U10). This reaction yields sodium carbonate which is mixed with remaining NaOH solution (S13). The basic solution is used for purification and precipitation in U5, U7 and U8. The reaction system occurring in the Carbonation II unit (U10) may be summarized as:

$$2NaOH + CO_2 \Longrightarrow Na_2CO_3 + H_2O \quad \text{(relation 10)}$$

The solid residue S21 from the solid separation unit U6 comprises iron oxide, silicate and pyrochlore. Pyrochlore is the source of Nb and is extremely diluted at this point, with about 0.5% Nb (elem.) in 42% of pre-concentrate mass flow. In a physical beneficiation unit (U11) using a magnetic separation technique, the Nb grade is improved from 0.5% (elem) in the solid residue S21 to 2% Nb (elem.) in 10% of pre-concentrate mass flow in an upgraded residue S23. In the upgraded residue S23, the rest is mostly silicate and some iron oxide which is not removed during the physical beneficiation step (U11), and other remaining minor impurities. A tailing IV (S22) comprising iron oxide is rejected by physical separation in the Nb upgrade unit (U11).

The solid residue S23 containing 2% Nb (S23) is leached at atmospheric pressure with HCl (S28) as known in the art to remove the remaining iron and other leachable impurities (U12). Almost 5% of total REE which has not been leached in U4 may be recovered in this unit U12. The filtrate (S25) of this unit (U12), which contains mostly ferric chloride and some free acid, is directed to the unit U4 in order to leach REE from ammoniated concentrate (S9). The leach recovery of Nb at this step is insignificant.

The acid leach residue S24 contains silicate and pyrochlore with some minor impurities. It has 5% Nb (elem.) in 4% MP.

The acid leach residue S24 goes to pressurized HCl leaching (U13) at 200° C., 10% solid, 4 hours retention time in an autoclave stirred reactor, fed with HCl solution S19 produced by Chlor-Alkali electrolysers in 30% w/w. Niobium extraction occurs in an autoclave reactor. The solid residue from HCl leaching (U12) consists of silicate, some metal impurities and niobium trapped in pyrochlore (S24). The silicate is not leachable even in strong acidic medium. Therefore, pyrochlore cracking and Nb extraction in this unit (U13) occurs selectively.

Tailing V (S26) is a silicate residue. The solution S27 contains different soluble forms of niobium chloride. Some minor metal chlorides including some REEs are also present in this solution S27. These REEs are together with CeIV which is not extractable under mild leaching condition.

In a solvent Extraction unit U14, dissolved Nb migrates selectively from the aqueous solution S27 to the organic solvent during solvent extraction, leaving the impurities (i. e. Ti, Ce, Fe) behind. Then Nb will be stripped by fresh HCl and converted into $Nb_2O_5$ S29 as the final Nb product. The raffinate phase S28 with strong acidity and small amount of impurities goes for HCl leaching (U12).

High acid consumption in a conventional REEs extraction method is due to the presence of dissolvable elements including iron and gangue minerals besides REEs in the concentrate. In order to decrease the acid consumption, the present invention provides removing the alkali earth metals, originated from gangue minerals, prior to REE leaching (U4). Moreover, ferric chloride leaching (U4) allows avoiding the use of acid directly for REE extraction in presence of ferric oxide. Although some acid is used to produce the ferric chloride $FeCl_3$ before entering to spent leach section (U12), extraction with ferric chloride allows leaving iron oxide behind and leaching REE selectively. Consequently, the acid consumption is significantly reduced compared to methods of the prior art. Moreover, the present method allows extracting Nb with the same amount of acid prior to enter to the REE extraction circuit.

Figure 2:
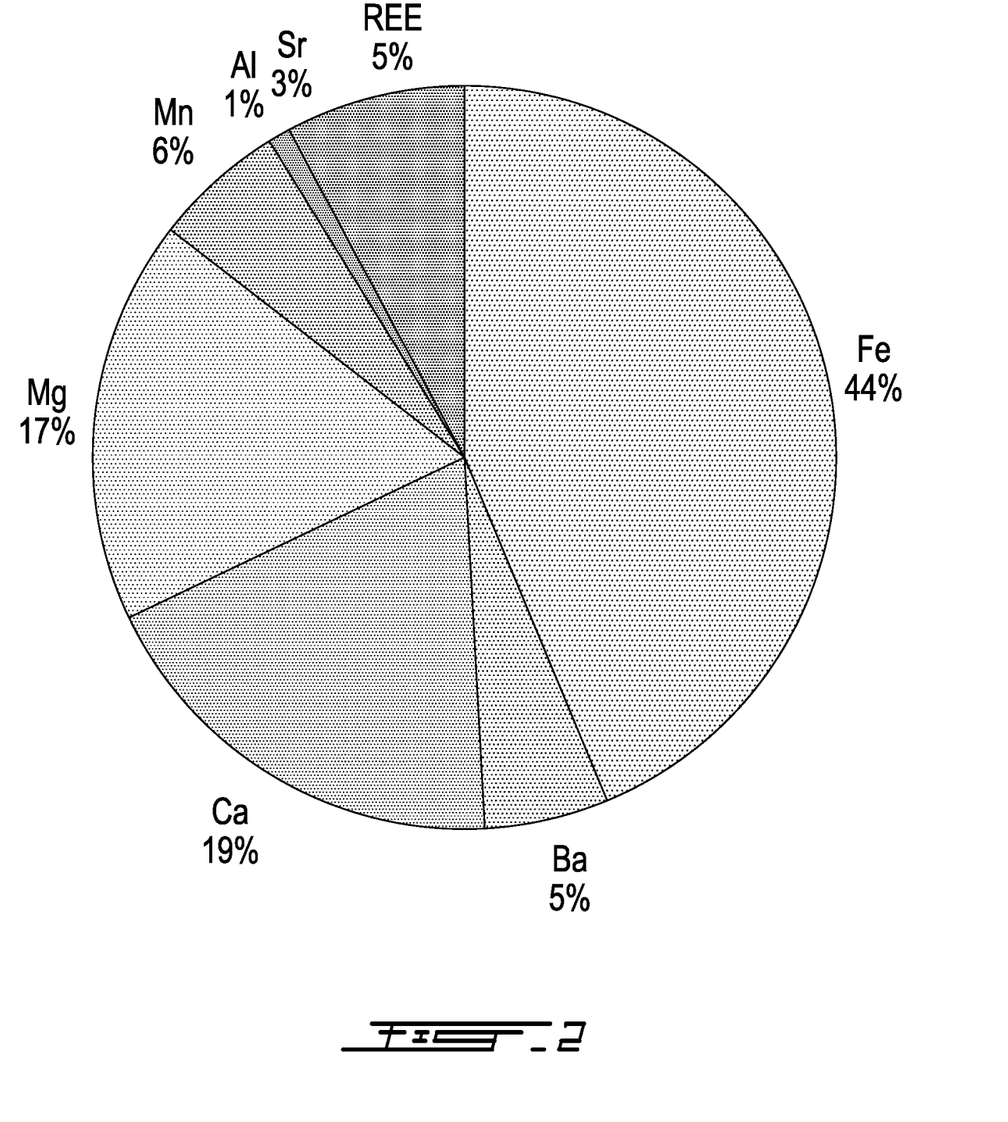
FIG. 2 is a diagrammatic view of HCl consumption for +99% REE recovery from a flotation concentrate, with a total acid consumption of 293 kg HCl (100%)/metric ton (MT), using methods of the prior art.

For instance, REE extraction from Montviel flotation concentrate FC (see Table 1 above) requires 293 kg HCl (100%)/MT ore to attain +99% REE recovery using methods of the prior art. The corresponding acid consumption distribution is shown in FIG. 2. FIG. 2 shows that 88% of the acid consumption is used to elute iron and gangue minerals (Ba, Ca, Mg, Mn, Al, Sr) while 5% of the acid consumption is used to extract REEs.

As summarized in FIG. 5, the present method generally comprises removing the alkali earth metals through ammoniation of the flotation concentrate (step 10), leaching with ferric chloride (step 20), and solid physical separation (step 30) and acid leaching (step 40).

Figure 3:
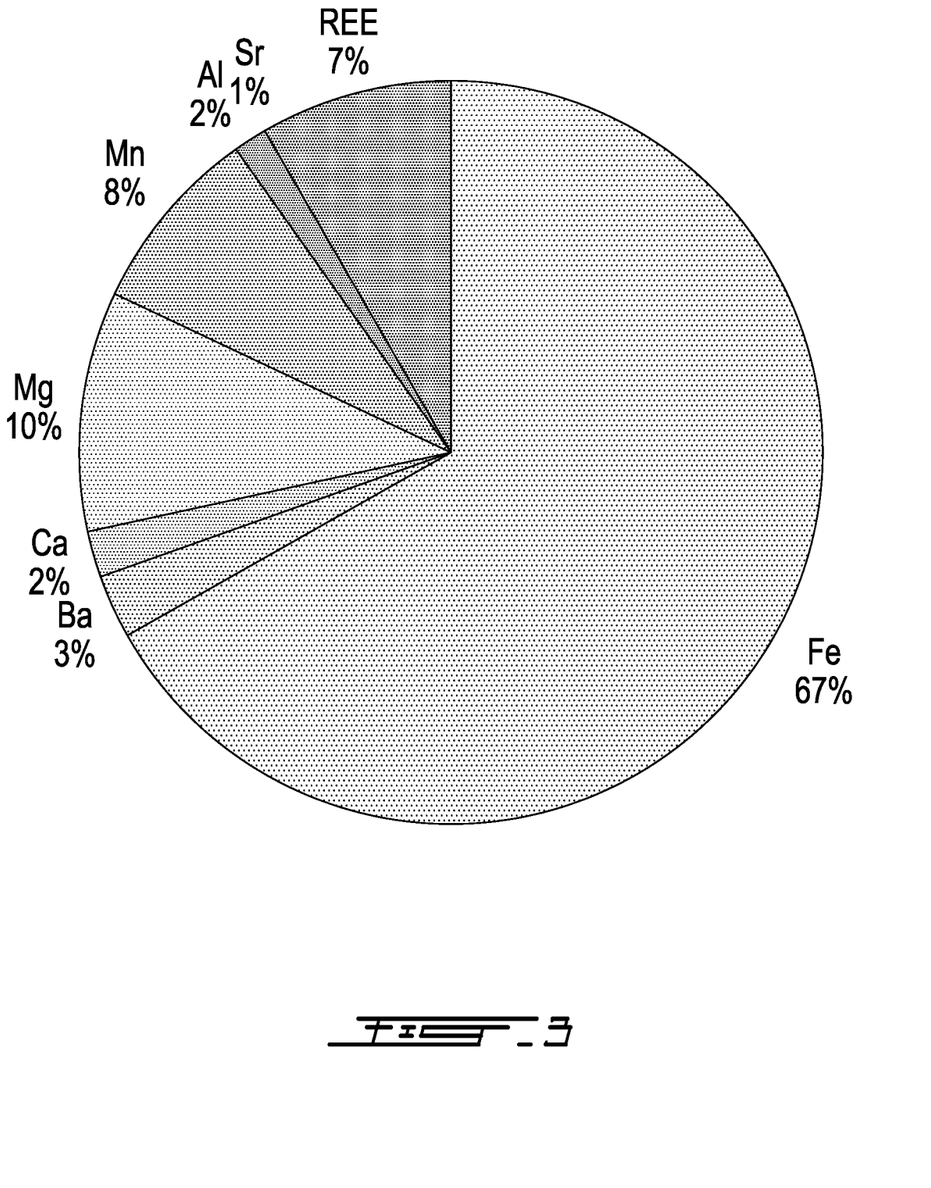
FIG. 3 is a diagrammatic view of HCl consumption for recovery of 99% and more REE from an ammoniated flotation concentrate, with a total acid total acid consumption of 191 kg HCl (100%)/MT, using methods of the prior art.

The alkali earth metals originated from gangue minerals are thus removed in part, without consuming any reagent or imposing significant energy penalty. The only source of energy is needed in the calciner (U1), which serves as a multipurpose unit as described hereinabove. According to metal recoveries shown in Table 2 above, the acid consumption for +99% REE extraction drops to 191 kg HCl (100%)/MT ore after ammoniation, i.e. once the alkali earth metals have been removed. Acid consumption distribution in FIG. 3 shows that 67% of this acid consumption is still related to iron and 7% is used to extract REEs.

Figure 4:
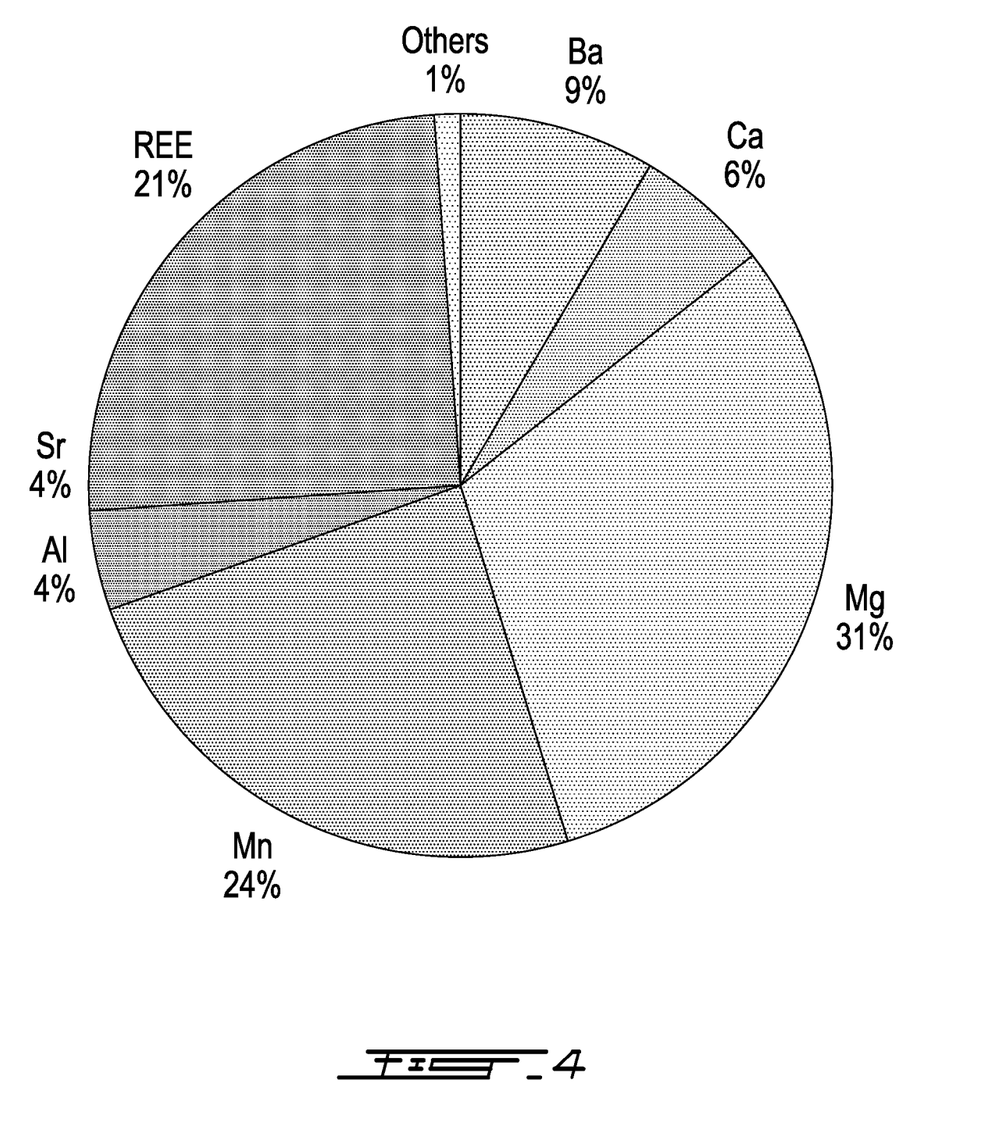
FIG. 4 is a diagrammatic view of HCl consumption for recovery of 99% and more REE from an ammoniated flotation concentrate with a total acid consumption of 63.2 kg HCl (100%)/MT, according to the method of the present invention.

Spent leaching with ferric chloride instead of leaching with fresh HCl has two main advantages. It guaranties that the chlorine ions react only with REEs and other alkali impurities and not with ferric oxide. Therefore, the total amount of chlorine required to extract +99% of REE drops to 63.2 kg HCl (100%)/MT ore. Also, it allows the same acid to be used for residue cleaning (U12), which is a critical step during Nb extraction. FIG. 4 shows the acid consumption associated to each element of a Montviel flotation concentrate using the present invention: the total acid consumption diminished significantly and 21% thereof is used for REE extraction.

Physical separation (U6, U11) followed by an acid leaching (U12) allows to upgrade and extract Nb from extremely low grade residue without significant loss on Nb recoveries (final product 2, S29) while using the same amount of total acid per ton of ore necessary for REE extraction as a mixed REE carbonate concentrate (final product 1, S14).

Also, the treatment of the material before the purification section (U5) makes it possible to cut any other reagent (oxidizers, e.g. $O_2$ gas, NaClO, or Oxalic acid) from this purification section (U5). The only reagent for purification (U5) and precipitation (U7) of REEs is a basic solution which is a by-product of the acid regeneration unit (U9).

The present invention is characterized by at least the following features:

Ammoniation is used to remove the alkali earth metals, originated from gangue minerals, from the flotation concentrate prior to REE extraction to reduce total acid consumption per ton of ore.

REE leaching is performed with ferric chloride. As ferric chloride does not react with ferric oxide, the chlorine value consumption at this step is significantly reduced.

A calciner (U1) is used to enable ammoniation (U2), spent leaching (U4) and purification (U5) with only basic by-product of acid regeneration (U9). Calcination as a way of pre-treating the pre-concentrate allows the remaining of the method. For example, the ammoniation reaction (relation 1) will occur only on metal oxides, not metal carbonates as exist in pre-concentrate (S1). The calciner (U1) converts metal carbonates to metal oxides, ready to be treated with ammonium chloride (U2). Another important role of calciner is to convert $Fe^{II}$ (ferrous iron) which is abundant in pre-concentrate (S1) to $Fe^{III}$ (ferric iron). Without that, ferrous chloride will form during HCl leaching (U12). In contrast to ferric chloride, ferrous chloride will not react with metal oxide and spent leaching with iron chloride (relation 6) will not occur in U4. Furthermore, it is ferric iron chloride which can be precipitated separately from REEs during purification (U5). Ferrous iron will co-precipitate with REEs during purification at the same condition and prevent REE purification. In such a case, ferrous iron must be converted to ferric inside liquid before precipitation, using $O_2$ gas or hydrogen peroxide. Another method is to use a reagent to precipitate REEs selectively, leaving ferrous iron behind in solution such as oxalic acid. Those reagents may affect the feasibility of the process. Converting ferrous to ferric in the calciner prevents those technical difficulties and save significant amount of reagents.

Physical beneficiation (U6, U11) is performed on the solid residue after REE extraction (S12) to remove dissolvable impurities without using reagent and only with physical methods, thereby allowing rejecting the iron oxide and extracting Nb without additional acid.

Atmospheric leaching (U12) is achieved with HCl (S28) to remove final impurities from the upgraded solid residue containing 2% Nb (S23) obtained after physical beneficiation (U6, U11), to remove the remaining iron and other leachable impurities (U12), yielding a clean solid residue (S24), which is directed to Nb extraction, and ferric chloride (S25) recycled for REE extraction (U4).

Integration of a Chlor-Alkali unit as an acid/base regeneration unit which produces and regenerates all the acid/base required for the method, allows eliminating the need for acid/base transportation to the site.

The present method allowing minimizing the acid consumption for extraction of rare earth elements and Niobium is reminiscent of counterflow methods in heat exchangers to maximize the efficiency of the systems. Here, fresh concentrated acid is first used at the very end of the process in an autoclave reactor (U13) to extract Niobium, which is a most difficult metal element to leach among others. Then, the same acid is used to remove iron, the second most difficult element to remove, from an upgraded solid residue in the earlier stage (U4). The filtrate which contains significant amount of ferric chloride with much less acidity strength is then transferred to the early stage of the process to react with active metals and rare earth elements (U4). Therefore, chlorine flows counter to the flow of solid within the process while losing its acidity strength, which is less needed in the earlier stages of the process as compared to the end.

The scope of the claims should not be limited by the embodiments set forth in the examples, but should be given the broadest interpretation consistent with the description as a whole.

The invention claimed is:

1. A method for hydrometallurgical extraction of rare earth elements and niobium from an ore or a flotation concentrate containing rare earth elements, niobium, iron and alkali earth metals, the method comprising removal of the alkali earth metals with an acidic solution having a pH in a range between about 1 and about 6, leaching the rare earth elements; precipitation of the rare earth elements from a resulting pregnant leach solution with sodium hydroxide, sodium carbonate and sodium bicarbonate; physically separating metal hydroxides from a resulting leach residue of said leaching, the leach residue containing metal hydroxides, iron oxide, silicate, and pyrochlore; removing the iron oxide by physical beneficiation and then by atmospheric acid leaching; and recovering niobium by pressurized acid leaching.

2. The method of claim 1, comprising, prior to said removal of the alkali earth metals, calcination of the ore or flotation concentrate, said removal of the alkali earth metals being performed on a resulting calcined fraction; said leaching of the rare earth elements comprising leaching the rare earth elements at a pH of about 1 at atmospheric pressure; said pressurized acid leaching comprising leaching niobium and remaining rare earth elements from said physical beneficiation with HCl to yield a clean residue and ferric iron chloride; said pressurized acid leaching comprising HCl leaching of the clean residue, fed with recycled HCl, in order to extract niobium.

3. The method claim 1, comprising, prior to said removal of the alkali earth metals, calcination of the ore or flotation concentrate, said removal of the alkali earth metals being performed on a resulting calcined fraction.

4. The method of claim 3, said removal of the alkali earth metals comprising reacting alkali earth metal oxides in the calcined fraction with ammonium chloride, yielding higher grade rare earth oxides in a solid phase and alkali earth metal chlorides in a liquid phase, the method further comprising ammonium chloride recovery by a carbonation reaction yielding alkali earth carbonate precipitate and a recovered ammonium chloride.

5. The method of claim 1, comprising, prior to said removal of the alkali earth metals, calcination of the ore or flotation concentrate, said removal of the alkali earth metals being performed on a resulting calcined fraction; said leaching of the rare earth elements comprising leaching the rare earth elements at a pH of about 1 at atmospheric pressure; said pressurized acid leaching comprising leaching niobium and remaining rare earth elements from said physical beneficiation with HCl to yield a clean residue and ferric iron chloride; said pressurized acid leaching comprising HCl leaching of the clean residue, fed with recycled HCl, in order to extract niobium, wherein remaining $CO_2$ gas from said calcination is absorbed with a NaOH solution to produce at least one of sodium carbonate and sodium bicarbonate.

6. The method of claim 1, comprising, prior to said removal of the alkali earth metals, calcination of the ore or flotation concentrate, said removal of the alkali earth metals being performed on a resulting calcined fraction; said leaching of the rare earth elements comprising leaching the rare earth elements at a pH of about 1 at atmospheric pressure; said pressurized acid leaching comprising leaching niobium and remaining rare earth elements from said physical beneficiation with HCl to yield a clean residue and ferric iron chloride; said pressurized acid leaching comprising HCl leaching of the clean residue, fed with recycled HCl, in order to extract niobium, wherein remaining $CO_2$ gas from said calcination is absorbed with a NaOH solution to produce at least one of sodium carbonate and sodium bicarbonate, said leaching of the rare earth elements and said precipitation of the rare earth elements comprising a reaction with a basic solution of the at least one of sodium carbonate and sodium bicarbonate, yielding at least one of rare earth-carbonates and rare earth hydroxides and a depleted leach solution, the method further comprising precipitating remaining metal impurities from the depleted leach solution and recycling a resulting NaCl solution to regenerate HCl and NaOH.

7. The method of claim 1, comprising, prior to said removal of the alkali earth metals, calcination of the ore or flotation concentrate, said removal of the alkali earth metals being performed on a resulting calcined fraction; said leaching of the rare earth elements comprising leaching the rare earth elements at a pH of about 1 at atmospheric pressure; said pressurized acid leaching comprising leaching niobium and remaining rare earth elements from said physical beneficiation with HCl to yield a clean residue and ferric iron chloride; said pressurized acid leaching comprising HCl leaching of the clean residue, fed with recycled HCl, in order to extract niobium, wherein remaining $CO_2$ gas from said calcination is absorbed with a NaOH solution to produce at least one of sodium carbonate and sodium bicarbonate, and further comprising, prior to said precipitation of the rare earth elements, increasing a pH of the pregnant leach solution to about 3.1 with a basic solution of the at least one of sodium carbonate and sodium bicarbonate.

8. The method of claim 1, comprising, prior to said removal of the alkali earth metals, calcination of the ore or flotation concentrate, said removal of the alkali earth metals being performed on a resulting calcined fraction; said leaching of the rare earth elements comprising leaching the rare earth elements at a pH of about 1 at atmospheric pressure; said pressurized acid leaching comprising leaching niobium and remaining rare earth elements from said physical beneficiation with HCl to yield a clean residue and ferric iron chloride; said pressurized acid leaching comprising HCl leaching of the clean residue, fed with recycled HCl, in order to extract niobium, wherein remaining $CO_2$ gas from said calcination is absorbed with a NaOH solution to produce at least one of sodium carbonate and sodium bicarbonate, wherein said precipitation of the rare earth elements comprises a reaction with a basic solution of the at least one of sodium carbonate and sodium bicarbonate, yielding at least one of rare earth carbonates and rare earth hydroxide in a solid phase and a depleted leach solution.

9. The method of claim 1, comprising, prior to said removal of the alkali earth metals, calcination of the ore or flotation concentrate, said removal of the alkali earth metals being performed on a resulting calcined fraction; said leaching of the rare earth elements comprising leaching the rare earth elements at a pH of about 1 at atmospheric pressure; said pressurized acid leaching comprising leaching niobium and remaining rare earth elements from said physical beneficiation with HCl to yield a clean residue and ferric iron chloride; said pressurized acid leaching comprising HCl leaching of the clean residue, fed with recycled HCl, in order to extract niobium, wherein remaining $CO_2$ gas from said calcination is absorbed with a NaOH solution to produce at least one of sodium carbonate and sodium bicarbonate, wherein said precipitation of the rare earth elements comprises a reaction with a basic solution of the at least one of sodium carbonate and sodium bicarbonate, yielding at least one of rare earth carbonates and rare earth hydroxide in a solid phase and a depleted leach solution, the method further comprising precipitating remaining metal impurities from the depleted leach solution with a basic solution of the at least one of sodium carbonate and sodium bicarbonate, and recycling a resulting NaCl solution for acid/base regeneration.

10. The method of claim 1, wherein said physically separating the metal hydroxides from the resulting leach residue of said leaching comprises physically separating the metal hydroxides from the leach residue of said leaching containing metal hydroxides and iron oxide with silicate, pyrochlore and a minor amount of remaining rare earth elements.

11. The method of claim 1, wherein said physically separating the metal hydroxides from the resulting leach residue of said leaching comprises physically separating the metal hydroxides from the leach residue of said leaching containing metal hydroxides and iron oxide with silicate, pyrochlore and a minor amount of remaining rare earth elements, and said atmospheric acid leaching of the clean solid residue is done with used acid, and said pressurized acid leaching is done with fresh acid.

12. The method of claim 1, wherein said physically separating the metal hydroxides from the resulting leach residue of said leaching comprises physically separating the metal hydroxides from the leach residue of said leaching containing metal hydroxides and iron oxide with silicate, pyrochlore and a minor amount of remaining rare earth elements, said pressurized acid leaching of the clean solid residue is done with used acid, and said pressurized acid leaching is done with fresh acid, said method further comprising recycling a filtrate from said atmospheric acid leaching to said leaching of the rare earth elements.

13. The method of claim 1, further comprising extracting niobium by solvent extraction, and recycling an acid from said solvent extraction to said atmospheric acid leaching.

14. A method for extracting rare earth elements and niobium from a ferrocarbonatite ore, comprising: step a) removing $CO_2$ from the ore; step b) removing a first part of alkali earth metals from the ore; and step c) removing a remaining part of the alkali earth metals and recovering the rare earth elements and niobium, wherein said step a) comprises heat treating the ore to yield $CO_2$ and a calcined phase; said step b) comprises treating the calcined phase with an acidic solution having a pH in a range between about 1 and about 6 to yield a calcined concentrate; and said step c) comprises leaching the calcined concentrate at atmospheric pressure, at a pH of about 1, with one of: i) ferric chloride and ii) HCl, and recovering ferric hydroxide precipitate resulting from said step c).

* * * * *